United States Patent [19]

Buzby et al.

[11] Patent Number: 5,080,759

[45] Date of Patent: Jan. 14, 1992

[54] METHOD FOR CONTROLLING STICKIES IN PULP AND PAPERMAKING PROCESSES USING RECYCLED PAPER

[75] Inventors: John H. Buzby, Willow Grove; Robert D. Evans, Warminster, both of Pa.

[73] Assignee: Quaker Chemical Corporation, Wilmington, Del.

[21] Appl. No.: 577,409

[22] Filed: Sep. 4, 1990

[51] Int. Cl.$^5$ ............................................. D21H 17/12
[52] U.S. Cl. ................................. 162/158; 162/147; 162/181.2; 162/189; 162/199; 162/DIG. 4
[58] Field of Search ..................... 162/5, 181.1, 181.2, 162/199, 189, DIG. 4, 158, 147

[56] References Cited

U.S. PATENT DOCUMENTS

| | | | |
|---|---|---|---|
| 3,028,297 | 4/1962 | Lagally | 162/181.1 |
| 3,058,936 | 10/1962 | Leclercq et al. | 260/29.2 |
| 3,471,361 | 10/1969 | Brill | 162/181.2 |

FOREIGN PATENT DOCUMENTS

| | | | |
|---|---|---|---|
| 1175340 | 3/1959 | France . | |
| 55-122094 | 9/1980 | Japan | 162/5 |

OTHER PUBLICATIONS

R. W. J. McKinney, "A Review of Stickie Control Methods, Including the Role of Surface Phenomena in Control," *1989 Contaminant Problems & Strategies in Wastepaper Recycling, Proceedings*, TAPPI Press, pp. 101-107 (1989).
M. R. Doshi, "Additives to Combat Sticky Contaminants in Secondary Fibers," *1989 Contaminant Problems and Strategies in Wastepaper Recycling, Proceedings*, TAPPI Press, pp 81-89 (1989).
J. C. Lerch et al., "Slotted Screen System Evaluation at Garden State Paper," *1989 Contaminant Problems & Strategies in Wastepaper Recycling, Proceedings*, TAPPI, pp. 17-20 (1989).
H. W. Verseput, "Stickies and Recycled Boxboard," *1989 Contaminant Problems & Strategies in Wastepaper Recycling, Proceedings*, TAPPI Press, pp. 7-10 (1989).
W. E. Smith, "Three-Way Contaminant Dispersion—A New Process for Secondary Fiber Mills," *1989 Contaminant Problems & Strategies in Wastepaper Recycling, Proceedings*, TAPPI Press, pp. 133-141 (1989).
G. M. Dykstra et al., "Controlling Stickies with Water-Soluble Polymers," *1989 Contaminant Problems & Strategies in Wastepaper Recycling, Proceedings, TAPPI, pp. 97-100 (1989).*
D. E. Wade, "Sticky Pacification with Synthetic Pulps," *Pulping Conference, Proceedings*, TAPPI Press, pp. 579-583 (1987).
J. Q. Goldberg et al., "Use of Zirconium Chemical in Sticky Contaminants Control," *Pulping Conference, Proceedings*, pp. 585-590 (1987).
G. R. Williams, "Physical Chemistry of the Adsorption of Talc, Clay, and Other additives on the Surface of Sticky Contaminants," *Pulping Conference, Proceedings*, TAPPI Press, pp. 563-570, (Nov. 1987).
*Encyclopedia of Chemical Technology*, "Thyroid and Antithyroid Preparations to Vinyl Polymers," 3rd Ed., vol. 23 (John Wiley and Sons), p. 228.
DuPont Company Literature on "TYZOR ®" Organic Titanates.
Huls America Inc. Technical Bulletin, p. 27.

*Primary Examiner*—Peter Chin
*Attorney, Agent, or Firm*—Panitch, Schwarze, Jacobs & Nadel

[57] ABSTRACT

The deposition of stickies on machinery used in the pulping and papermaking processes and in the final paper produced in the papermaking process using secondary or recycled paper is controlled by adding an amount of a water-soluble organotitnium(IV) compound to the aqueous system of a pulping and/or papermaking process, effective to reduce or remove the deposition of the stickies on the machinery and the resulting paper.

15 Claims, No Drawings

METHOD FOR CONTROLLING STICKIES IN PULP AND PAPERMAKING PROCESSES USING RECYCLED PAPER

BACKGROUND OF THE INVENTION

This invention relates to a method for effectively eliminating or reducing the detrimental effects in pulp and papermaking processes caused by tacky contaminants present in the secondary cellulosic fiber of recycled paper. More particularly, the present invention pertains to a method for reducing or eliminating the detrimental effects of secondary fiber contaminants such as waxes and adhesives, by rendering them less tacky while in the aqueous pulp medium.

Many types of papermaking processes and paper products produced use or contain repulped secondary fiber. These paper products include linerboard, corrugated medium, tissue, towel, as well as wet pulp prepared and sold for later use in preparation of these products.

The present invention involves the use of water soluble organotitanium(IV) compounds to react with the contaminants from secondary fiber, significantly reducing the tackiness of such contaminants, and thus reducing or eliminating their deposition within newly formed sheets of paper or on production equipment.

These tacky recycled paper contaminants, commonly referred to as "stickies," are derived from hot melts, pressure sensitive adhesives, binders for coatings and inks, wet strength resins, or any of the multitude of waxy or polymeric additives that might be found on recycled paper. The stickies encompass a wide variety of water insoluble synthetic polymeric materials, including, for example, polyethylene, polybutadiene-styrene, polyvinyl-acetate and polyacrylates. Stickies are distinct from pitch which is a naturally occurring resinous material from the extractive fraction of wood.

Stickies sometimes remain associated with the secondary fiber after repulping. More commonly, however, stickies will reagglomerate in the aqueous system of the papermaking process, causing numerous problems for the papermaker. Such contaminants typically form deposits on the various components of the papermaking equipment, including wires, press felts, press rolls, dryers and calendar rolls. Such deposition often results in lost production time and decreases in machine efficiency due to sheet breaks, limited machine speeds due to wire filling and excessive downtime for deposit clean-up. Further, the clean-up of stickies deposits often requires use of large amounts of solvents, many of which are hazardous and/or flammable, and large amounts of worker time.

Additionally, the adhesive properties of stickies which contaminate the paper sheets produced by the papermaking processes result in many sheet defects. Such defects include holes, specks, poor water absorbency properties and lower strength, among other defects. Such defects can have significant impact on the quality and acceptability of the sheet as well as on the subsequent processing, such as gluing the sheets to prepare corrugated products.

There are numerous methods which have been used for control of stickies. Procurement and selection of waste paper can be controlled so as to reduce the amount of troublesome stickies entering into the mill. In recent years, considerable progress has been made in fine screening and cleaning. Pressure screens with 0.01 inch slots have shown to be effective in removing some stickies. Thermal and/or mechanical dispersion units are available to break up contaminants into smaller-sized particles which are not readily visible in the final sheet. Examples of these control methods are found in McKinney, R. W., "A Review of Stickie Control Methods, Including The Role of Surface Phenomena in Control," 1989 *Contaminant Problems And Strategies In Wastepaper Recycling Seminar—Proceedings*, Tappi Press, p. 101 (1989); Doshi, M. R., "Additives to Combat Sticky Contaminants in Secondary Fiber," Ibid., p. 81; Lerch, J. C., "Slotted Screen System Evaluation At Garden State 5 Paper," Ibid., p. 17; Venseput, H. W., "Stickies and Recycled Boxboard," Ib , p. 7; and Smith, W. E., "Three Way Contaminant Dispersion—A New Process for Secondary Fiber Mills," Ibid., p. 133.

Various chemical approaches to the problem have incorporated talc, polymers and dispersants, but with only limited success. The hydrophilic surface and large surface area of talc provides ample sites for absorption of stickies with resultant inhibition of sticky agglomeration. Talc, however, has limitations in that large amounts are often necessary resulting in white water buildup and showers plugging. An example of a talc control method is found in Williams, G. R., "Physical Chemistry of the Adsorption of Talc, Clay, and Other Additives on the Surface of Sticky Contaminants," *Proceedings of TAPPI Pulping Conference*, November 1987.

Solvents and dispersants have also been used to control stickies. These solvents include various aromatic hydrocarbons such as xylenes and toluene, along with kerosenes, and chlorinated solvents such as methylene chloride or 1,1,1-trichloroethane. The use of these solvents do not totally remove deposits of stickies and often present concerns of toxicity, odor and flammability. Use of solvents for stickies control can be found in Doshi, M.R., "Additives to Combat Sticky Contaminants in Secondary Fiber," 1989 *Contaminant Problems and Strategies in Wastepaper Recycling Seminar—Proceedings*, TAPPI Press, p. 81 (1989).

Dispersants have also been used for stickies control. These compounds can generally be categorized as cationic, anionic or nonionic. Cationic additives generally act to enhance the attachment of the stickies to the fibers, thus preventing their deposition on the wires and felts of papermaking machinery. Adsorption of anionic dispersants on stickies renders the stickies negatively charged and thus inhibits agglomeration. Nonionic dispersants also function predominantly by inhibiting agglomeration of stickies. Examples of uses of such additives can be found in Dykstra, G. M. and May, O.W., "Controlling Stickies with Water Soluble Polymers," 1989 *Contaminant Problems and Strategies in Wastepaper Recycling Seminar—Proceedings*, TAPPI Press, p. 97 (1989).

While the use of dispersants has met with some success, their use has not significantly reduced or solved the problems associated with stickies deposition. Moreover, these additives also have been found to be sensitive to pH, temperature and the presence of other chemicals, such as defoamers and biocides, which tend to limit their use, as well as lower their efficiency.

In certain applications, synthetic polypropylene fibers have been used for scavenging inks and sticky particles from secondary fiber stock. Scav-EX 235is a product of this type which is supplied by Hercules, Inc.

These types of synthetic fibers have found some limited success. An example of their use is found in Wade, D. E., "Sticky Pacification with Synthetic Pulps," *Paper No.* 3, *Proceedings from* 1987 *TAPPI Pulping Conference.*

Zirconium compounds have also been used to control the effects of secondary fiber contaminants. Zirconium compounds such as ammonium zirconium carbonate and zirconium acetate function by reacting with many hot melts and pressure sensitive adhesives, thereby considerably reducing the stickies, tackiness. Reference to the use of zirconium chemicals in control of stickies deposits can be found in Goldberg, J. Q., "Use of Zirconium Chemicals in Sticky Contaminants Control," *Paper No.* 4, *Proceedings from* 1987 *TAPPI Pulping Conference.*

While the existing methods for controlling the deleterious effects of secondary fiber contaminants have found some success, stickies deposition continues to be a serious problem to the makers of paper and paper products who utilize recycled paper.

Organotitanium chemicals have been used by the paper industry since the late 1950s, principally for use in crosslinking organopolysiloxanes used in rendering paper and cardboard surfaces more hydrophobic, thereby improving ink acceptance. Examples of such use can be found in U.S. Pat. No. 3,058,936 and Finland Patent No. 1,175,340. Cellulose treated with triethanolamine titanate has been reported to exhibit a considerably higher wet strength than that from untitanated pulp. The titanic acid yielded from aqueous solutions of triethanolamine titanate was reported to be the active compound for obtaining improved wet strength and ink acceptance properties with paper. *Z. Anorg. Allg. Chem.*, 403, 337 (1974)).

SUMMARY OF THE INVENTION

In accordance with the present invention, there is provided a method for controlling stickies present in pulping and papermaking processes which utilize recycled paper. The method comprises formulating a stickies control agent consisting essentially of a water-soluble organotitanium(IV) compound and adding the stickies control agent to a water stream that comes into contact with recycled cellulose pulp fibers in the pulping and papermaking processes in an amount sufficient to reduce or eliminate the tackiness and deposition of the stickies on machinery used in the pulping and papermaking processes and to reduce the tackiness and deposition of the stickies in paper produced in the papermaking process, wherein the stickies are synthetic resinous contaminants from the recycled paper.

DETAILED DESCRIPTION OF THE PREFERRED EMBODIMENTS

The invention provides a method of controlling stickies present in repulping and papermaking processes utilizing recycled paper. As used herein, the term "controlling stickies" or equivalent terms means the prevention or reduction or removal of stickies depositions on machinery used in the pulping and papermaking processes using recycled paper and the prevention or reduction of stickies deposition in the final paper produced thereby. The stickies control agent used in controlling stickies, namely, a water-soluble organotitanium(IV) compound, may be used in varying amounts, depending on the type of control desired, the type of stickies involved, the amount of stickies on the machinery or the paper, the type of repulping or papermaking process involved, and other factors well known to those skilled in the art, based on the present disclosure.

In the usual practice of the method of this invention, a water-soluble organotitanium compound is added to the aqueous or water system of a papermaking process containing the secondary fiber used to manufacture the paper product. Addition of the organotitanium(IV) compounds of the method of the invention results in significantly reduced tackiness and adhesive properties of the stickies contaminants commonly found in recycled paper, thereby rendering them less likely to agglomerate and be deposited on the machinery or resulting paper and thus, reducing or eliminating the deleterious effects caused by such deposition.

The compound of the method of the invention is an organotitanium complex, also referred to as an organotitanium coordination complex. In a preferred embodiment of the invention, the titanium atom has four bonding or complexing sites, and the watersoluble organotitanium(IV) complex (hereinafter referred to as Compound I) has the following structure:

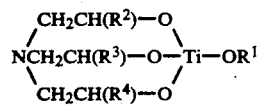

wherein $R^1$ is selected from the group consisting of alkyl of 3 to 8 carbons, phenyl, aralkyl of 7 to 10 carbons, cyclohexylmethyl, 3-cyclohexyl-1propyl, 2-(2-pyridyl)ethyl, 2-piperidinoethyl, $NH_2CH_2CH_2$-, $(CH_3)_2NCH_2CH_2$-, $CH_3OCH_2CH_2OCH_2CH_2$- and $CH_3(CH_2)_3OCH_2CH_2OCH_2CH_2$-; and $R^2$, $R^3$ and $R^4$ are independently selected from the group consisting of H- and $CH_3$-.

The presently preferred compounds within the structure of Compound I are compounds wherein $R^1$ is selected from the group consisting of n-alkyl of 4 to 8 carbons, $CH_3(CH_3)CH$-, $CH_3(CH_3)CHCH_2$-, $CH_3(CH_3)CH(CH_3)CH$-, $CH_3(CH_3)CHCH_2CH_2$-, $CH_3CH_2(CH_3)CHCH_2$-, $CH_3CH_2(CH_3)_xCCH_2$-, $CH_3CH_2CH_2CH_2(CH_3)CHCH_2$-; and $R^2$, $R^3$ and $R^4$ are independently selected from the group consisting of H- and $CH_3$-.

The presently most preferred compound corresponding to Compound I is titanium hexoxide tris(2,2',2''-nitrilo)isopropoxide, where $R^1$ is $C_6H_{13}$ and each of $R^2$, $R^3$ and $R^4$ is $CH_3$-.

Organotitanium complexes within the structure of Compound I are commercially available, such as the compound titanium isopropoxide tris(2,2',2''-nitrilo)ethoxide which is readily available from E. I. duPont de Nemours & Co., Inc., as Tyzor TE ™. Moreover, for organotitanium complexes within the structure of Compound I which are not presently readily available commercially, a chemist of ordinary skill in the art could readily prepare such compounds without undue experimentation in view of the present disclosure. In general, to prepare complexes having the structure of Compound I, the following general preparative technique may be used.

Titanium tetraisopropoxide and one equivalent of an alcohol are added to a round bottom flask. The mixture is distilled under nitrogen at a temperature not exceeding 130.C. After one equivalent of isopropanol has been removed, the reaction is cooled to room temperature. A trialkanolamine chelate (one equivalent per Ti) is added and the mixture distilled under nitrogen at a temperature not exceeding 130 C until approximately 2.4 equivalents of isopropanol are removed. The resulting product has the general structure of Compound I.

In another preferred embodiment of the invention, the titanium atom has six bonding or complexing sites, and the water-soluble organotitanium(IV) complex (hereinafter referred to as Compound II) has the following general molecular structure:

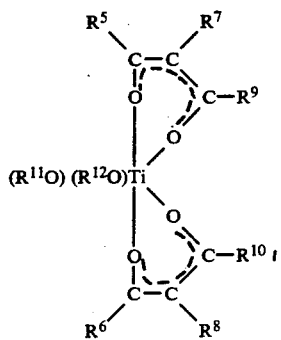

where $R^5$, $R^6$, $R^9$ and $R^{10}$ are independently selected from the group consisting of alkyl of 1 to 2 carbons, alkoxy of 1 to 2 carbons and benzyloxy;
$R^7$ and $R^8$ are independently selected from the group consisting of hydrogen and alkyl of 1 to 2 carbons; and
$R^{11}$ and $R^{12}$ are independently selected from the group consisting of alkyl of 2 to 8 carbons.

Organotitanium complexes with the general molecular structure of Compound II may be the cis isomer of structure III or the trans isomer of structure IV as follows:

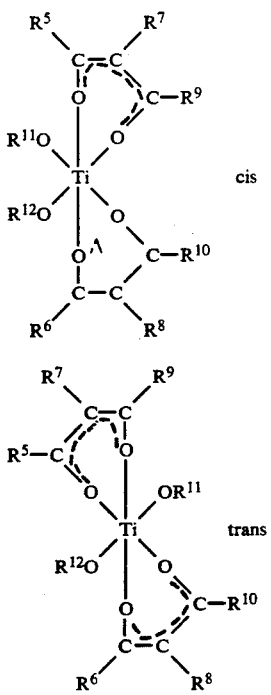

In general, the cis iomer of structure III is preferred over the trans isomer of structure IV in the method of the present invention, in that the cis isomer is more soluble than the trans isomer. Nevertheless, both the cis and trans isomers are believed to be effective in controlling stickies in pulping and papermaking processes according to the present invention.

The presently preferred embodiments of organotitanium complexes within the structure of Compound II are compounds wherein
$R^5$, $R^6$, $R^9$ and $R^{10}$ are independently selected from the group consisting of alkyl of 1 to 2 carbons;
$R^7$ and $R^8$ are selected from the group consisting of hydrogen and methyl; and
$R^{11}$ and $R^{12}$ are independently selected from the group consisting of alkyl of 3 to 8 carbons.

The presently most preferred complex within the structure of Compound II is the cis isomer III, cis titanium diisoproproxide bis(2,4-pentanedionate), wherein $R^5$, $R^6$, $R^9$ and $R^{10}$ are $CH_3$-, $R^7$ and $R^8$ are hydrogen, and are $CH_3(CH_3)CH$-, commercially available from Aldrich Chemical Company. When this compound is solubilized in water, it can convert to the trans isomer IV. Another example of an organotitanium complex within the general structure of Compound II is titanium diisopropoxide bis(ethyl-3oxobutanoate), which is commercially available from E. I. duPont de Nemours & Co, Inc., as Tyzor DC ™. Moreover, for organotitanium complexes within the structure of Compound II which are not presently readily available commercially, a chemist of ordinary skill in the art could readily prepare such compounds without undue experimentation in view of the present disclosure. In general, to prepare complexes having the structure of Compound II, the following general preparative technique may be used.

Titanium tetraisopropoxide and two equivalents of an alcohol are added to a round bottom flask. The mixture is distilled under nitrogen at a temperature not exceeding 140° C. After two equivalents of isopropanol have been removed, the reaction is cooled to room temperature. A beta-dike to chelate (2 equivalents per Ti) is added and the mixture distilled under nitrogen at a temperature not exceeding 140 C until about 1.5 equivalents of isopropanol are removed. The resulting product has the general composition of Compound II.

The method of the invention can be used to control stickies deposition in any conventional repulping and papermaking operations which use secondary or recycled paper. Such processes include, but are not limited to, those using recycled corrugated containers, deinked ledger paper, coated book paper, and newsprint used in the preparation of such products as linerboard, corrugated media, tissue, fine paper, toweling, newsprint and specialty paperboard.

The organotitanium(IV) compounds used in the method of the invention are believed to be equally effective with the various types of stickies contaminants commonly found in recycled paper. These include, but are not limited to, acrylics, ethylene vinylacetate copolymers, carboxylated polyethylenes, terpene resins, and styrene-butadiene rubbers. These tacky materials are usually introduced into the papermaking system from single side pressure sensitive tapes, splicing tapes and hot melt glues for bookbindings and box sealants present with the secondary fibers.

In general, a water-soluble organotitanium(IV) compound is added as a solid or as an aqueous or alcoholic solution to an aqueous slurry of recycled fiber at a location after the waste fiber repulper and prior to the wet end of the paper machine. Preferred points of addition in the papermaking system include high density cleaners, dump chests, primary screens, secondary screens, centrifugal cleaners, thickeners, high density storage chest, leveling chest and machine chest, for example.

The amount of water-soluble organotitanium(IV) compound to be added to a pulping or papermaking process depends on the extent of stickies build-up already in the system, if any, the type of pulping, repulping or papermaking process, the type of recycled paper or secondary fiber being used, the presence of other contaminants, the particular organotitanium(IV) compound or blend selected, and other parameters associated with such processes. The amount of water-soluble organotitanium(IV) compound used in any aqueous stickies control agent formed according to the present invention may be determined readily by one of ordinary skill in the art without undue experimentation with reference to this disclosure. Some routine trial and error experimentation may be necessary to adjust the particular amounts to optimize the amounts and technique of addition of the organotitanium(IV) compound or water-soluble stickies control agent containing such compound.

In general, about 0.085 pound to about 1.7 pounds of organotitanium(IV) compound, equivalent to about 0.01 pound to about 0.46 pounds Ti, added as an aqueous solution per ton of dried pulp, should be suitable to control stickies. More of the water-soluble organotitanium(IV) compounds may be used if desired, but excess amounts may not be economical.

Preferably, about 0.085 pound to about 0.85 pound of organotitanium(IV) compound, equivalent to about 0.01 pound to about 0.23 pound of Ti, is added per ton of dry pulp as an aqueous solution to the aqueous slurry of the recycled fiber at the high density cleaners, dump chest or just prior to the primary screens used in the papermaking process. Additions at one of these points in the papermaking process permit sufficient interaction of the compounds of the method of the invention with the stickies before significant agglomeration and deposition occurs.

In one presently preferred embodiment of the invention, Compound I, where $R^1$ is $C_6H_{13}$- and $R^2$, $R^3$ and $R^4$ are $CH_3$-, namely, titanium hexoxide tris(2,2',2''-nitrilo)isopropoxide, is added to the aqueous secondary fiber pulp slurry in an amount of about 0.085 pound to about 0.85 pound equivalent to about 0.012 pound to about 0.12 pound of titanium per ton of dried pulp, at the point in the papermaking system immediately after the repulper, but prior to pulp cleaning and screening section.

In another presently preferred embodiment of the invention, Compound II, where $R^5$, $R^6$, $R^9$ and $R^{10}$ are $CH_3$-, $R^7$ and $R^8$ are H- and $R^{11}$ and $R^{12}$ are $CH_3(CH_3)CH$-, namely, titanium diisopropoxide bis(2,4-pentanedionate), is added to the aqueous secondary fiber pulp slurry in an amount of about 0.085 pound to about 0.85 pound, equivalent to about 0.011 pound to about 0.11 pound titanium per ton of dried pulp, at a point in the system immediately after the repulper, but before pulp cleaning and screening section.

The invention will now be described in more detail with reference to the following specific, nonlimiting examples.

The following Examples serve to illustrate the preparation of organotitanium complexes within the ambit of Compounds I and II employed in the method of the invention and to demonstrate the efficacy of the method of the invention.

EXAMPLE 1 preparation of Compound I

The compound titanium hexoxide tris (2, 2', 2''-nitrilo)isopropoxide, where $R^1$ is $C_6H_{13}$- and $R^2$, $R^3$ and $R^4$ are CH -, was prepared in the following manner. Titanium tetraisopropoxide (25.8 g, 0.0907 mol) and 1-hexanol (9.3 g, 0.091 mol) was added to a 100 mL round bottom flask fitted with a magnetic stirrer, distillation head and source of nitrogen fitted with a Firestone valve. Distillation was carried out under nitrogen at 120–140° C. until one equivalent of isopropanol was collected. The mixture was cooled to room temperature and then, with cooling, triisopropanolamine (17.36 g, 0.0908 mol) was added. This mixture was distilled under nitrogen at 120–140° C. until collection of isopropanol ceased (82% conversion). The mixture was cooled to room temperature to yield the product as a light yellow, slightly turbid oil (32.64 g, 78.7% yield).

EXAMPLE 2

Preparation of Compound II

The compound cis titanium dihexoxide bis(2,4-pentanedionate), where $R^5$, $R^6$, $R^9$ and $R^{10}$ are $CH_3$-, $R^7$ and $R^8$ are H- and $R^{11}$ and $R^{12}$ are $CH_3(CH_2)_4CH_2$-, was prepared in the following manner. Titanium tetraisopropoxide (26.5 g, 0.0932 mol) and 1-hexanol (19.11 g, 0.187 mol) were added to a 100 mL round bottom flask fitted with a magnetic stirrer, distillation head and source of nitrogen fitted with a Firestone valve. Distillation was carried out under nitrogen at 120–140° C. until two equivalents of isopropanol were collected. The mixture was cooled to room temperature and then, with cooling, 2,4pentanedione (18.71 g, 0.1869 mol) was added. This mixture was distilled under nitrogen at 130–135° C. until collection of isopropanol ceased. The mixture was cooled to room temperature to yield the product as a light yellow liquid.

EXAMPLE 3

Tackiness Reduction Testing of Organotitanium(IV) Compounds

A thin film of Rhoplex N-619 TM, a pressure sensitive acrylic emulsion adhesive, available from Rohm and Haas Company, was cast on 2 inch x 4 inch electrogalvanized steel panels and allowed to dry for twelve hours. This adhesive is typical of many stickies contaminants found in recycled paper. The panels with the adhesive films were immersed in 0.92% w/v solutions of various compounds used in the method of the invention (as indicated in the following Table 1) for one minute, removed, rinsed with distilled water and air dried for twelve hours. After air drying, a 7.5 cm×3.0 cm×0.1 cm strip of cardboard was placed on the adhesive film and weighted with 600 g for a two-minute period. The effectiveness of the titanium compounds of the method of the invention in reducing the tackiness of the adhesive film was determined by measuring the strength of the cardboard strip/adhesive bond using a Model QC II-XS Twing Albert Tensile Tester TM. Table 1 shows the results obtained with representative organotitanium(IV) compounds of the present invention. A control was treated only with water.

TABLE 1

Tackiness Reduction by Organotitanium Compounds

| Compound Type* | Additive | Strength (lbs) of Cardboard Strip/Adhesive Bond |
|---|---|---|
| | None | 12.9 |
| III | titanium diisopropoxide bis(2,4-pentanedionate) | 6.1 |
| III | titanium dihexoxide bis(2 4-pentanedionate) | 4.9 |
| I | titanium hexoxide tris(2,2',2"-nitrilo)isopropoxide | 2.3 |
| I | titanium cyclohexoxide tris(2,2',2"-nitrilo)ethoxide | 9.7 |
| I | titanium isopropoxide tris(2,2',2"-nitrilo)ethoxide | 10.2 |

*I = Compound I structure
III = Compound II cis structure IV

The results indicate that the compounds of the method of the invention are useful and effective in reducing tackiness of an adhesive representative of a stickies compound. The compounds of the method of the invention tested reduced strengths to 2.3–10.2 pounds from the 12.9 pounds of the control.

EXAMPLE 4

Tackiness Reduction Testing Using A Modified Twing ™ Albert Tensile Tester

An additional modified configuration of the Twing ™ Albert Tensile Tester was used to determine tackiness reduction of various adhesive polymer coatings by organotitanium(IV) compounds.

Adhesive lattices were applied onto 2.5 inch×4.5 inch degreased carbon steel panels using a Gardner 84 rod. The coated panels were oven cured at 120°–130° F. for 20 minutes, then air cured for 24 hours. Hot melt adhesives were applied by melting onto the test panel surface, then wiped to a uniform film.

Test solutions of the organotitanium(IV) compounds (2% w/v) were prepared fresh in distilled water. The coated panels were placed in 500 mL of the test solution, agitated for 5 minutes, removed and allowed to dry prior to testing.

The test panels were placed on an aluminum heating plate situated horizontally on a moving support. The heating plate was heated to a test surface temperature indicated in Table 2 which was controlled to ±1° F. The test panel was held in place by a top plate bolted to the heating plate. The entire heating and test panel assembly was raised until it contacted and supported a ½ inch diameter probe tip which was loosely threaded into a cylindrical weight, which was in turn attached to a load cell supported by an overhead static support. The combined mass of the probe tip and cylindrical weight was 10.8 lbs. Contact was maintained for 60 seconds. The entire heating and test panel assembly was then lowered until the peak force, in pounds, was obtained and recorded. The force required to break the adhesive surface bond was calculated using the following equation:

Force Required to Break the Adhesive Surface Bond = Peak Force Recorded - 10.8 lbs.

The % tack reduction relative to the force required to break the adhesive surface bond of the untreated surface was then determined.

The adhesive polymer coatings used included Rhoplex N-619 ™, an acrylic pressure sensitive adhesive available from Rohm & Haas Company; AC ™ 5120, an ethylene-acrylic acid copolymer from AC Polyethylene; AC ™ 430, an ethylene-vinyl acetate copolymer from AC Polyethylene; and Synthemul ™ 40-554, a carboxylated vinyl acetate-acrylate copolymer from Reichold Chemical Company. Test temperatures were determined based on the glass transition temperatures of the indicated adhesives, in order to enhance the tackiness of the adhesives. Control panels were placed in deionized water. The results are shown in Table 2.

TABLE 2

Adhesive Tackiness Reduction (modified Twing Tester ™)

| Adhesive | Test Temperature (°F.) | Test Compound | Force (lbs) | % Tack Reduction* |
|---|---|---|---|---|
| Rhoplex N-619 ™ | 70° | Control | 19.6 | — |
| | | Titanium diisopropoxide bis(2,4-pentanedionate) | 12.1 | 38.3 |
| AC 5120 ™ | 135° | Control | 5.0 | — |
| | | Titanium diisopropoxide bis(2,4-pentanedionate) | 2.9 | 42.0 |
| AC 430 ™ | 85° | Control | 3.3 | — |
| | | Titanium diisopropoxide bis(2,4-pentanedionate) | 2.4 | 27.3 |
| | | Ammonium zirconium carbonate | 2.5 | 24.2 |
| Synthemul ™ 40-554 | 120° | Control | 16.9 | — |
| | | Titanium diisopropoxide bis(2,4-pentanedionate) | 0 | 100 |
| | | Titanium cyclohexoxide tris(2,2',2"-nitrilo)ethoxide | 12.3 | 20.1 |

*% Tack Reduction = $100 - \left( \frac{\text{Experimental Force}}{\text{Control Force}} \times 100 \right)$

EXAMPLE 5

Tackiness Reduction Testing Using A Rolling Ball Test Method

Steel panels measuring 4 inches×12 inches were prepared and treated in the same manner as that described previously in Example 4. A ramp 24 inches long at a 30 angle from horizontal led into a six-inch runout ramp placed at a 10. angle above horizontal, which led to the horizontal 4 inches×12 inches treated panel surface. Ball bearings having a mass of 1.07 g or 8.35 g, depending upon the tackiness of the adhesive polymers, were rolled down the ramps onto the treated surface, and the distance traveled measured. The velocity of the rolling ball at the end of the runout ramp was determined. Assuming that the deceleration of the ball on the tacky surface is constant, and using the measured distance traveled by the ball on the panel surface, the time from initial contact to zero velocity was calculated using the following equation:

$$t = x/0.5 \, Vi$$

where t=time from initial contact of ball on panel surface to zero velocity,
x=distance traveled and
Vi=initial velocity.

To make numerical comparisons of the rolling ball test data, the deceleration rate was then calculated using the following equation:

$$D = Vi/t$$

where D=deceleration rate and a deceleration force (or frictional force) can be calculated as follows:

$$F = (D)(Mb)$$
$$= (MB)(Vi)^2/2x$$

where
F=deceleration or frictional force and
Mb=mass of the ball.

Using this method, the efficacy of a 2% solution of titanium diisopropoxide bis(2,4-pentanedionate) in reducing the tackiness of various adhesive polymers, including Rhoplex N-619 TM; Tylac 68-302 TM, a carboxylated polyacrylonitrile available from Reichold Chemical Company; and Covinax 358-05 TM, an acrylic emulsion available from Franklin Chemical Company, was determined and is indicated in Table 3. All tests were performed at 70° F; the control was treated only with water.

TABLE 3

Adhesive Tackiness Reduction (Rolling Ball Method)

| Adhesive | Untreated Surface (Control) Frictional Force (dynes) | Treated Surface Frictional Force (dynes) | % Tack Reduction* |
|---|---|---|---|
| Tylac 68-302 TM | 1,228 | 0 | 100 |
| Rhoplex N-619 TM | 7,051 | 592 | 91.6 |
| Covinax 358-05 TM | 24,048 | 10,428 | 56.6 |

*% Tack Reduction =

$$100 - \left( \frac{\text{Experimentall Frictional Force}}{\text{Control Frictional Force}} \times 100 \right)$$

The results presented in Tables 2 and 3 indicate that the representative embodiment of compound I tested was effective in reducing the tack of various types of adhesive polymer coatings. Reductions in tackiness of 27.3% for AC 430 TM up to 100% for Synthemul 40-554 TM were observed using titanium diisopropoxide bis(2,4-pentanedionate). An embodiment of compound II, titanium cyclohexoxide bis(2,2',2"-nitrilo)ethoxide, was evaluated for tack reduction of Synthemul 40-554 TM. The results indicated that this compound reduced the tack of this adhesive by 20.1%.

EXAMPLE 6

Stickies Count Reduction in a Pulp Slurry Containing Secondary Fiber

A sample of an aqueous slurry of repulped secondary fiber from a recycled pulp mill, equivalent to 50 g of dry pulp, was added to a standard pulp disintegrator. The standard pulp disintegrator was filled to capacity with water and 0.125 g of titanium isopropoxide tris(2,2',2"-nitrilo)ethoxide was added as a 70% solution in isopropanol and the slurry mixed for ten minutes. The flat screen (slotted screen with parallel 0.006 inch slots) of a Voith Valley Laboratory Flat Screen Tester was filled with water, and the Tester motor turned on to continuously vibrate the screen. The pulp slurry was slowly poured from the British Disintegrator onto the flat screen with running water until all of the pulp was removed through the slots and the water in the screen was clear. The water was turned off and allowed to drain. The stickies were scraped off the screen with a spatula and dispersed in 250 ml of water. The stickies were then collected on a filter pad having a 1 cm grid by filtration in a Buchner funnel. The pad was heated in an oven at 140.C for 15 minutes, removed, cooled to room temperature and using a pointed probe, each contaminant particle on the pad was examined for tackiness under a 20X microscope. If the contaminant stuck to the probe, it was counted.

Following completion of this analysis, the total stickies count was determined, multiplied by 2 and reported on the basis of 100 grams of dry pulp. The results are reported in Table 4.

TABLE 4

Reduction of Stickies From Secondary Fiber

| | Stickies count per 100 g Dry Secondary Fiber |
|---|---|
| No Additive | |
| Run No. 1 | 20 |
| 2 | 18 |
| 3 | 17 |
| 4 | 22 |
| 5 | 18 |
| Avg. | 19 |
| Titanium isopropoxide tris(2,2',2"-nitrilo) ethoxide | |
| Run No. 1 | 14 |
| 2 | 10 |
| 3 | 8 |
| Avg. | 10.7 |

The results from Table 4 indicate that the representative embodiment of Compound I tested was effective in reducing the stickies count from secondary fiber. Stickies counts of 8 to 14 per 100 g of dry secondary fiber were obtained when titanium isopropoxide tris(2,2',2"-nitrilo)ethoxide was added to a concentration of 0.175% w/v based on dry pulp as compared to 17 to 22 detected when no additive was present. The present invention may be embodied in other specific forms without departing from the spirit or essential attributes thereof and, accordingly, reference should be made to the appended claims, rather than to the foregoing specification as indicating the scope of the invention.

We claim:

1. A method for controlling stickies present in pulping and papermaking processes which utilize recycled paper, comprising:

adding a stickies control agent consisting essentially of a water-soluble organotitanium(IV) compound to a water stream that comes into contact with recycled cellulose pulp fibers in the pulping and papermaking processes in an amount sufficient to reduce or eliminate the tackiness and deposition of the stickies on machinery used in the pulping and papermaking processes and to reduce the deposition of the stickies in paper produced in the papermaking processes, wherein the stickies are synthetic resinous contaminants from the recycled paper.

2. The method of claim 1 wherein the water-soluble organotitanium (IV) compound is selected from the group consisting of Compounds I and II having the respective structures:

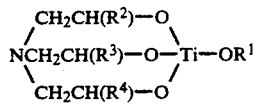

I wherein $R^1$ is selected from the group consisting of alkyl to 3 to 8 carbons, phenyl, aralkyl of 7 to 10 carbons, cyclohexylmethyl, 3-cyclohexyl-1-propyl, 2-(2-pyridyl)ethyl, 2-piperidinoethyl, $NH_2CH_2CH_2-$, $(CH_3)_2NCH_2CH-$, $CH_3OCH_2CH_2OCH_2CH_2-$ and $CH_3(CH_2)_3OCH_2CH_2OCH_2CH_2-$; and $R^2$, $R^3$ and $R^4$ are independently selected from the group consisting of H- and $CH_3-$; and

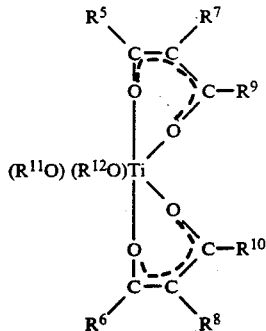

II where $R^5$, $R^6$, $R^9$ and $R^{10}$ are independently selected from the group consisting of alkyl of 1 to 2 carbons, alkoxy of 1 to 2 carbons and benzyloxy;

$R^7$ and $R^8$ are independently selected from the group consisting of hydrogen and alkyl of 1 to 2 carbons; and $R^{11}$ and $R^{12}$ are independently selected from the group consisting of alkyl of 2 to 8 carbons.

3. The method of claim 2 wherein the organotitanium(IV) compound is Compound I, wherein $R^1$ is selected from the group consisting of n-alkyl of 4 to 8 carbons, $CH_3(CH_3)CH-$, $CH_3(CH_3)CHCH_2-$, $CH_3(CH_3)CH(CH_3)CH-$, $CH_3(CH_3)CHCH_2CH_2-$, $CH_3CH_2(CH_3)CHCH_2-$, $CH_3CH_2(CH_3)_2CCH_2-$, $CH_3CH_2CH_2CH_2(CH_3)CHCH_2-$; and $R^2$, $R^3$ and $R^4$ are independently selected from the group consisting of H- and $CH_3-$.

4. The method of claim 3 wherein $R^1$ is $C_6H_{13}-$ and each of $R^2$, $R^3$ and $R^4$ is $CH_3-$.

5. The method of claim 2 wherein the organotitanium(IV) compound is Compound II having a structure selected from the group consisting of cis isomer of structure III and trans isomer of structure IV as follows:

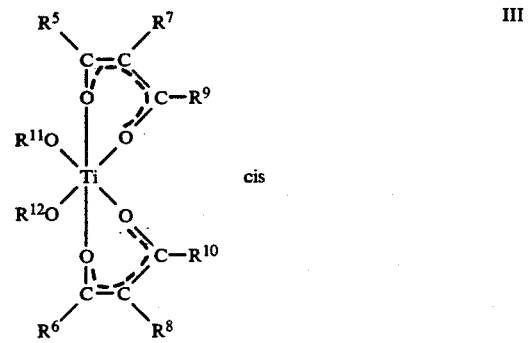

III cis

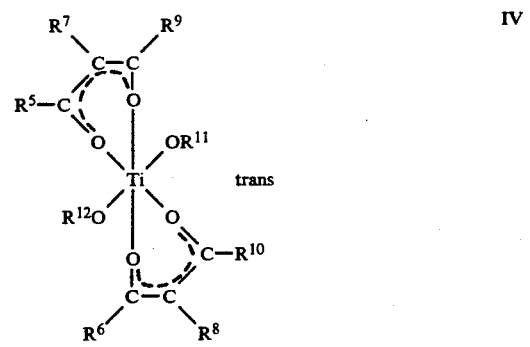

IV trans

6. The method of claim 5 wherein Compound II is the cis isomer of structure III and wherein $R^5$, $R^6$, $R^9$ and $R^{10}$ are independently selected from the group consisting of alkyl of 1 to 2 carbons;

$R^7$ and $R^8$ are selected from the group consisting of hydrogen and methyl; and $R^{11}$ and $R^{12}$ are independently selected from the group consisting of alkyl of 3 to 8 carbons.

7. The method of claim 6 wherein $R^5$, $R^6$, $R^9$ and $R^{10}$ are $CH_3-$, $R^7$ and $R^8$ are hydrogen, and $R^{11}$ and $R^{12}$ are $CH_3(CH_3)CH-$.

8. The method of claim 5 wherein Compound II is the trans isomer of structure IV and wherein $R^5$, $R^6$, $R^9$ and $R^{10}$ are independently selected from the group consisting of alkyl of 1 to 2 carbons.

$R^7$ and $R^8$ are selected from the group consisting of hydrogen and methyl; and $R^{11}$ and $R^{12}$ are independently selected from the group consisting of alkyl of 3 to 8 carbons.

9. The method of claim 8 wherein $R^5$, $R^6$, $R^9$ and $R^{10}$ are $CH_3-$, $R^7$ and are hydrogen, and $R^{11}$ and $R^{12}$ are $CH_3(CH_3)CH-$.

10. The method of claim 1 wherein step (b) comprises adding the stickies control agent in a repulping process or to the holding tank, centrifugal cleaners or the lines leading to the slotted screens or centrifugal cleaners at a point downstream of the repulper.

11. The method of claim 1 wherein step (b) comprises adding the stickies control agent to a stock preparation system of a pulping process comprising at least one of a high density chest, a stock blending chest, a refiner, a machine chest or a stuff box.

12. The method of claim 1 wherein step (b) comprises adding the stickies control agent to a wet end of a paper machine used in the papermaking process.

13. The method of claim 1 wherein step (b) comprises adding the stickies control agent to a blender immediately before a machine chest of a Fourdrinier paper machine used in the papermaking process.

14. The method of claim 13 wherein step (b) comprises adding the stickies control agent in an amount of about 0.085 to about 0.85 pounds per ton of dry pulp.

15. The method of claim 14 wherein the stickies control agent is selected from the group consisting of titanium hexoxide tris (2,2',2"nitrilo)isopropoxide and titanium diisopropoxide bis(2,4-pentanedionate).

* * * * *